US007719158B2

(12) United States Patent
Angerpointner et al.

(10) Patent No.: US 7,719,158 B2
(45) Date of Patent: May 18, 2010

(54) SLIP-RING BRUSH AND SLIP-RING UNIT EQUIPPED WITH SUCH A SLIP-RING BRUSH

(75) Inventors: Ludwig Angerpointner, Munich (DE); Klaus Drost, Wolfratshausen (DE)

(73) Assignee: LTN Servotechnik GmbH, Ottering (DE)

( * ) Notice: Subject to any disclaimer, the term of this patent is extended or adjusted under 35 U.S.C. 154(b) by 524 days.

(21) Appl. No.: 11/624,084

(22) Filed: Jan. 17, 2007

(65) Prior Publication Data

US 2007/0167032 A1 Jul. 19, 2007

(30) Foreign Application Priority Data

Jan. 17, 2006 (DE) ...................... 10 2006 002 104

(51) Int. Cl.
*H02K 13/00* (2006.01)

(52) U.S. Cl. ........................ 310/239; 310/246; 310/242

(58) Field of Classification Search .......... 310/239–253
See application file for complete search history.

(56) References Cited

U.S. PATENT DOCUMENTS

| | | | | |
|---|---|---|---|---|
| 3,671,791 | A * | 6/1972 | Muller et al. | 310/219 |
| 3,959,679 | A * | 5/1976 | Buckley | 310/232 |
| 4,143,929 | A | 3/1979 | Boje et al. | |
| 4,155,023 | A * | 5/1979 | Hagenlocher et al. | 310/246 |
| 4,268,772 | A * | 5/1981 | Workman | 310/197 |
| 4,574,215 | A * | 3/1986 | Mabuchi | 310/239 |
| 4,583,797 | A | 4/1986 | Engelmore et al. | |
| 4,983,872 | A * | 1/1991 | Strobl | 310/239 |
| 5,294,852 | A * | 3/1994 | Straker | 310/68 C |
| 5,814,915 | A * | 9/1998 | Wang | 310/242 |
| 6,700,290 | B1 * | 3/2004 | Baines | 310/239 |
| 6,710,496 | B2 * | 3/2004 | Fujita et al. | 310/201 |
| 6,909,217 | B2 | 6/2005 | Angerpointner et al. | |
| 6,971,153 | B2 * | 12/2005 | Tokizawa et al. | 29/596 |
| 2001/0024735 | A1 * | 9/2001 | Kuhlmann-Wilsdorf et al. | 428/611 |
| 2002/0043886 | A1 * | 4/2002 | Fujita et al. | 310/201 |
| 2004/0242025 | A1 * | 12/2004 | Angerpointner et al. | 439/13 |

FOREIGN PATENT DOCUMENTS

| | | | |
|---|---|---|---|
| DE | 103 24 699 | | 9/2004 |
| GB | 2 207 295 | | 1/1989 |
| JP | 09182401 | A * | 7/1997 |
| JP | 10201203 | A * | 7/1998 |

OTHER PUBLICATIONS

Search Report, European Patent Application No. 06021459.0, dated May 11, 2007.

* cited by examiner

*Primary Examiner*—Quyen Leung
*Assistant Examiner*—Alex W Mok
(74) *Attorney, Agent, or Firm*—Kenyon & Kenyon LLP

(57) ABSTRACT

A slip-ring brush includes a holder and a brush element that has three regions. The brush element is joined in the first region to the holder, and exhibits a cross-sectional geometry having a cross-sectional area in the second region, which is predetermined for the contacting with a slip ring. The brush element has the same cross-sectional area in the third region as in the second region. The brush element is additionally arranged such that its third region is disposed between the first region and the second region. The cross-sectional geometry of the brush element in the third region is shaped so that it deviates from the cross-sectional geometry of the second region, to reduce the effective spring stiffness of the brush element.

27 Claims, 2 Drawing Sheets

SLIP-RING BRUSH AND SLIP-RING UNIT EQUIPPED WITH SUCH A SLIP-RING BRUSH

CROSS-REFERENCE TO RELATED APPLICATIONS

The present application claims priority to Application No. 10 2006 002 104.5, filed in the Federal Republic of Germany on Jan. 17, 2006, which is expressly incorporated herein in its entirety by reference thereto.

FIELD OF THE INVENTION

The present invention relates to a slip-ring brush and a slip-ring unit equipped with this slip-ring brush.

BACKGROUND INFORMATION

Slip-ring units are frequently made up, inter-alia, of a slip-ring brush and slip rings, the slip-ring brush having sliding contact with rotating slip rings during operation. Such slip-ring units are used in many technical fields for transmitting electrical signals or electric power, for example, from a stationary unit to a rotating electrical unit. In so doing, it is important that, for example, due to flexible brush elements, there is a sufficient and continuous contact between the slip-ring brush and the slip rings, even when, for example, the entire slip-ring unit is subject to vibrations.

U.S. Pat. No. 4,143,929 describes a slip-ring brush in which bent brush wires are fastened to a brush block. To achieve a high-quality spring mounting, the brush wires illustrated in FIG. 4 in U.S. Pat. No. 4,143,929 are relatively long and bent in large radius.

U.S. Pat. No. 4,583,797 describes a similar arrangement in which bent brush wires that are comparatively long are also described.

In German Published Patent Application No. 103 24 699, a slip ring is described which has substantially U-shaped brush wires. To improve their elastic quality, a special solder connection to the brush holder is provided.

SUMMARY

Example embodiments of the present invention provide slip-ring brushes and slip-ring units which may be produced with minimal expenditure and which are of high quality with respect to a reliable sliding contacting, even when working with small space.

According to example embodiments of the present invention, a slip-ring brush includes a holder and at least one brush element, which has three regions disposed in different locations. In the first region, the brush element is joined to the holder, that is, the brush element is fixed in position on the holder. The second region is predetermined for the contacting with a slip ring and exhibits a cross-sectional geometry having a cross-sectional area predefined in particular for the electrical function. The third region of the brush element has the same cross-sectional area, that is, a cross-sectional area of the same size as the second region, and is disposed between the first region and the second region. To reduce the effective spring stiffness of the brush element, the cross-sectional geometry of the brush element in the third region is shaped so that it deviates from the cross-sectional geometry of the second region. The respective cross-sectional geometries of the second region and third region are thus formed differently.

The effective spring stiffness should be understood to be the spring stiffness which is decisive for the reliable functioning of a slip-ring unit. The effective spring movement of the brush element is used to provide the sliding contact, even when the corresponding slip ring has geometric irregularities, or the slip-ring unit is subject to vibrations during operation. The effective spring stiffness thus relates to the elastic quality of the brush element in the direction toward the slip ring or in the direction away from the slip ring, i.e., in the radial direction relative to the axis of rotation of the slip-ring unit. The effective forces which are decisive for pressing the brush element against the respective slip ring are directed substantially in the direction of the axis of rotation of the slip-ring unit. The cross-sectional geometry of the third region of the brush element is shaped so that there is a reduced bending resistance with respect to bending moments, which result from the pressure forces and which are directed perpendicular to the axis of rotation of the slip-ring unit, and thus the spring stiffness of the brush element is reduced. This is achieved, e.g., by reducing the material thickness of the brush element in a direction orthogonal to the axis of rotation of the slip-ring unit and transverse to the contour (transverse to the longitudinal direction) of the brush element. Nevertheless, the absolute value of the cross-sectional area is not reduced.

The third region of the brush element may be located closer to the first region than to the second region. This arrangement may be provided for adjacent regions. Since a third region is disposed between a first region and a second region, the first region is closer to the third region than the second region, and specifically along the profile or the contour of the brush element.

The effective spring stiffness of the brush element may relate to spring movements that have a directional component in a predefined direction. One dimension of the brush element in the third region is smaller than one dimension of the brush element in the second region, the dimensions being valid or oriented in the same predetermined direction.

The brush element may have two opposite limbs, the brush element being arranged such that a second region is disposed on each of the two opposite limbs.

A third region may be assigned to at least one of the opposite limbs of the brush element. Due to spring movements of the brush element within one plane, movement of the second region takes place in a direction parallel to this plane. In this context, one dimension of the brush element in the third region is smaller than one dimension of the brush element in the second region. Both dimensions are oriented in this direction, i.e., hold true for this direction. Accordingly, the brush element is arranged such that during operation of the corresponding slip-ring unit, the effective spring movements proceed in one plane, and not in askew fashion in space. Therefore, the reduction of the dimension of the brush element in its third region must be established in a direction parallel to this plane. The special case, that the reduced dimension of the brush element is in this plane, is also covered by the formulation "parallel."

The brush element may have a circular cross-sectional geometry in the second region, the cross-sectional geometry of the brush element in the third region consequently deviating from a circular shape.

According to example embodiments of the present invention, a slip-ring unit includes at least one slip ring, a holder and at least one brush element. The brush element and the slip ring are rotatable relative to each other about an axis of rotation. The brush element may be implemented according to the preceding description. Consequently, the third region of the brush element between the second region (contact section slip ring-brush element) and the first region in which the brush element is joined to the holder. The cross-sectional geometry of the brush element in the third region is shaped so that it deviates from the cross-sectional geometry of the second region, as well, in order to reduce the effective spring stiffness of the brush element.

In the slip-ring unit, a brush element may have one dimension of the cross-sectional geometry in the third region that is larger than one dimension of the cross-sectional geometry of the brush element in the second region, the dimensions each being oriented in a direction having a directional component parallel to the axis of rotation, or being oriented exactly parallel to the axis of rotation of the slip-ring unit. Because the cross-sectional area in the second and in the third region of the brush element are of equal size, the cross-sectional geometry of the brush element in the third region is weakened or thinned orthogonally with respect to the axis of rotation relative to the second region, so that the effective spring stiffness is reduced. Accordingly, in the cross-sectional geometry of the third region of the brush element, one dimension is smaller than the dimension orthogonal thereto, which is oriented in a direction having a directional component parallel to the axis of rotation. In particular, the dimension orthogonal thereto may be oriented in a direction parallel to the axis of rotation.

The effective spring stiffness relates to spring movements which have a directional component in a direction orthogonal to the axis of rotation. One dimension of the brush element in the third region is smaller than one dimension of the brush element in the second region. Both dimensions are oriented in the direction having the directional component orthogonal to the axis of rotation.

This relationship may also be described relative to the bending moments, which are introduced onto the brush element during operation. Therefore, the effective spring stiffness relates to spring movements or bending movements, which are aligned about a neutral axis parallel to the axis of rotation of the brush element. The cross-sectional geometry of the brush element in the third region is weakened or thinned orthogonally with respect to the neutral axis in comparison to the second region, because there the dimension orthogonal to the axis of rotation is reduced compared to the second region. The effective spring stiffness is therefore also reduced.

The slip-ring unit may be arranged such that one dimension of the brush element in the third region in a direction having a directional component parallel to the axis of rotation is larger than one dimension in the third region which is aligned orthogonally with respect to this direction of the axis of rotation. In particular, the brush element in the third region is thicker in the direction of the axis of rotation than in the direction perpendicular to the axis of rotation, and specifically in the manner that the effective spring stiffness of the brush element is reduced.

The dimension of the brush element in the third region may be larger than one dimension of the brush element in the second region, the dimensions each being oriented in the same direction having a directional component parallel to the axis of rotation.

The slip ring may have a circumferential groove, the brush element in its second region fitting in this groove. The groove may have a V-shaped geometry. The combination of a circular cross-sectional geometry of the second region with a V-shaped groove contributes to a high-quality electrical sliding contacting.

According to an example embodiment of the present invention, a slip-ring brush includes: a holder; and a brush element having three regions. The brush element is joined to the holder in a first region of the brush element, and a second region of the brush element includes a cross-sectional geometry having a cross-sectional area predetermined for contact with a slip ring. A third region of the brush element has a cross-sectional area the same as the cross-sectional area of the second region, and the third region is disposed between the first region and the second region. A cross-sectional geometry in the third region is shaped to deviate from the cross-sectional geometry of the second region to reduce an effective spring stiffness of the brush element.

The third region may be arranged closer to the first region than to the second region.

The effective spring stiffness of the brush element may relate to spring movements that have a directional component in a direction, and a dimension, in the direction, of the brush element in the third region may be smaller than a dimension, in the direction, of the brush element in the second region.

The brush element may include two opposite limbs, and each of the two opposite limbs may include a respective second region.

At least one of the opposite limbs may include the third region, and movement of the second region may take place in a direction parallel to a plane due to spring movements of the brush element within the plane. A dimension, in the direction, of the brush element in the third region may be smaller than a dimension, in the direction, of the brush element in the second region.

The brush element may have a circular cross-sectional geometry in the second region and a non-circular cross-sectional geometry in the third region.

The effective spring stiffness of the brush element may relate to spring movements that have a directional component in a direction, and a dimension, in the direction, of the brush element in the third region may be smaller than a diameter of the brush element in the second region.

According to an example embodiment of the present invention, a slip-ring unit includes: a slip ring; a holder; and a brush element having three regions. The brush element and the slip ring are rotatable relative to each other about an axis of rotation, and the brush element is joined to the holder in a first region of the brush element. A second region of the brush element includes a cross-sectional geometry having a cross-sectional area and is in contact with the slip ring. A third region of the brush element has a cross-sectional area the same as the cross-sectional area of the second region, and the third region is disposed between the first region and the second region. A cross-sectional geometry of the brush element in the third region is shaped to deviate from the cross-sectional geometry of the second region to reduce an effective spring stiffness of the brush element.

A dimension, in a direction parallel to the axis of rotation, of the cross-sectional geometry of the brush element in the third region may be larger than a dimension, in a direction parallel to the axis of rotation, of the cross-sectional geometry of the brush element in the second region.

A dimension, in a direction orthogonal to the axis of rotation, of the cross-sectional geometry of the third region may be smaller than the dimension, in a direction parallel to the axis of rotation, of the cross-sectional geometry of the third region.

The third region may be arranged closer to the first region than to the second region.

The effective spring stiffness of the brush element may relate to spring movements having a directional component in a direction orthogonal to the axis of rotation, and a dimension, in the direction orthogonal to the axis of rotation, of the brush element in the third region may be smaller than a dimension, in the direction orthogonal to the axis of rotation, of the brush element in the second region.

The brush element may include two opposite limbs, and each of the two opposite limbs may include a respective second region.

At least one of the opposite limbs may include the third region, and movement of the second region may take place in a direction parallel to a plane due to spring movements of the brush element in the plane. A dimension, in a direction orthogonal to the axis of rotation, of the brush element in the third region may be smaller than a dimension, in the direction orthogonal to the axis of rotation, of the brush element in the second region.

A dimension, in a direction parallel to the axis of rotation, of the brush element in the third region may be larger than a dimension, in a direction orthogonal to the axis of rotation, in the third region.

The slip ring may include a circumferential groove, and the second region may fit in the groove.

The groove may have a V-shaped geometry.

The brush element may have a circular cross-sectional geometry in the second region and a non-circular cross-sectional geometry in the third region.

According to an example embodiment of the present invention, a slip-ring unit includes: a slip ring; a holder; and a brush element having three regions. The brush element and the slip ring are rotatable relative to each other about an axis of rotation, and the brush element is joined to the holder in a first region of the brush element. A second region of the brush element includes a cross-sectional geometry having a cross-sectional area and is in contact with the slip ring. A third region of the brush element has a cross-sectional area the same as the cross-sectional area in the second region, and the third region is disposed between the first region and the second region. A cross-sectional geometry of the brush element in the third region deviates from a circular shape, and a dimension, in a direction parallel to the axis of rotation, of the brush element in the third region is larger than a dimension, in a direction orthogonal to the axis of rotation, in the third region.

The brush element may include two opposite limbs, and each of the two opposite limbs may include a respective second region.

At least one of the opposite limbs of the brush element may include the third region, and movement of the second region may take place in a direction parallel to a plane due to spring movements of the brush element within the plane. A dimension, in the direction orthogonal to the axis of rotation, of the brush element in the third region may be smaller than a dimension, in the direction orthogonal to the axis of rotation, of the brush element in the second region.

The slip ring may include a circumferential groove, and the second region of the brush element may fit in the groove.

The groove may have a V-shaped geometry.

The brush element may have a circular cross-sectional geometry in the second region.

Further features and aspects of example embodiments of the present invention are described in more detail below with reference to the appended Figures.

DETAILED DESCRIPTION

Figure 1:
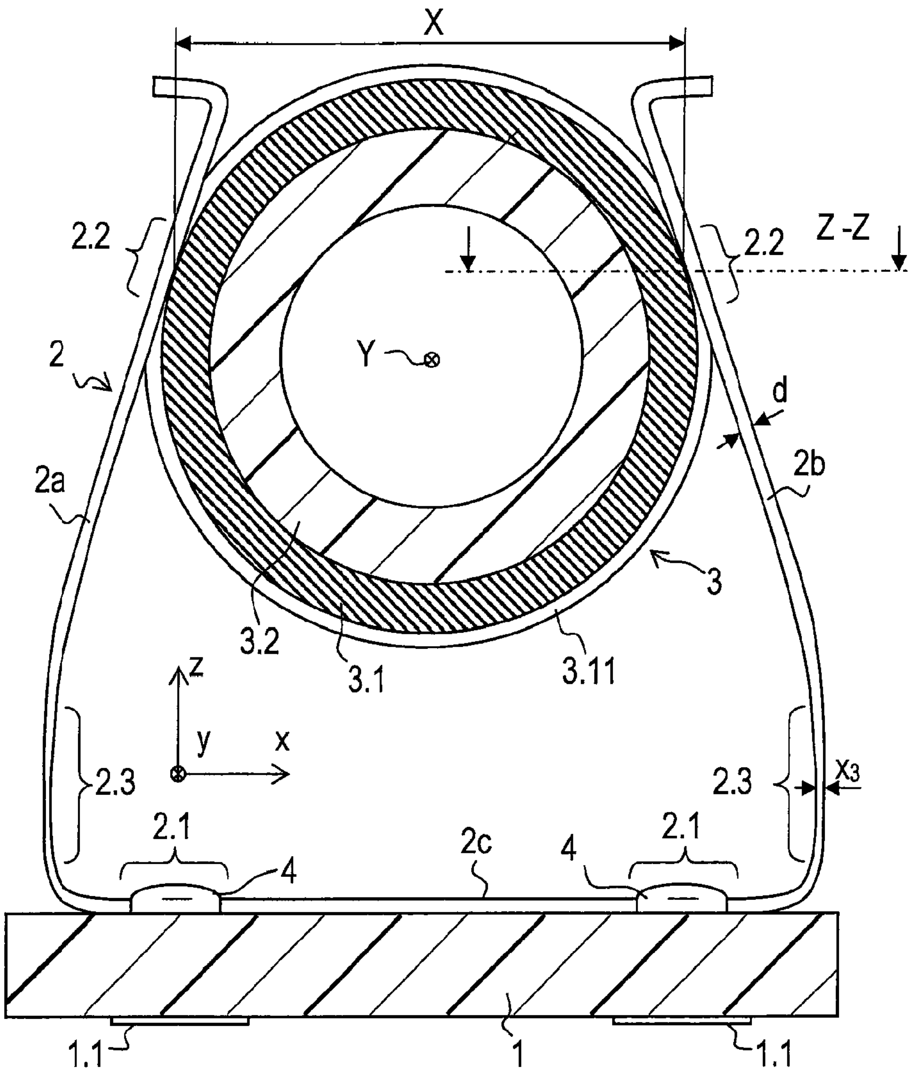
FIG. 1 is a cross-sectional view of a slip-ring unit.

As illustrated in FIG. 1, a slip-ring brush includes a holder 1 that is flexurally stiff and is in the form of a printed circuit board. Brush elements 2, which in the example illustrated are implemented as wire brackets, are joined to holder 1.

Brush elements 2 include three regions 2.1, 2.2, 2.3 disposed in different locations, each fulfilling different functions. Thus, provided on brush elements 2 are in each case two so-called first regions 2.1 in which respective brush element 2 is joined to holder 1. The specified joining is achieved via two fixing points 4, which are in the form of soldering points, and therefore represent a mechanical and an electrical connection of brush element 2 in first regions 2.1 to holder 1. The soldering points are implemented as plated-through holes, so that solder pads 1.1 on the opposite side (relative to brush element 2) of holder 1 are in electrical contact with brush elements 2. Connecting cables may be contacted to these solder pads 1.1, so that brush elements 2 may be electrically connected to a further device.

Brush elements 2, which here are all identical, furthermore have a second region 2.2, which is characterized in that it exhibits a circular cross-sectional geometry $Q_2$ having a cross-sectional area A and a diameter d. Moreover, second region 2.2 is predetermined for the contacting with a slip ring 3.1, and abuts against slip ring 3.1 in the assembled slip-ring unit. Brush elements 2 may be produced by a bending method from a wire, e.g., 20 mm in length, having a diameter of, e.g., 0.2 mm. Cross-sectional area A thus results, e.g., at approximately $3.14 \cdot 10^{-2}$ $mm^2$.

Each brush element 2 also has a third region 2.3. The third region is characterized, inter-alia, in that it is disposed between first region 2.1—the point of connection to holder 1—and second region 2.2. Starting from a second region 2.2, following the profile of the brush element or of the wire bracket, a third region 2.3 therefore comes first, before a first region 2.1 is reached. Moreover, each of the third regions 2.3 has a special cross-sectional geometry $Q_3$, whose function is discussed below.

In addition, in each case, brush elements 2 have three limbs 2*a*, 2*b*, 2*c*, and have a substantially U- or Ω-shaped form, so that each of brush elements 2 has an opening. Accordingly, two limbs 2*a*, 2*b* are opposite each other. In each case, a second region 2.2 may be assigned to each of these limbs 2*a*, 2*b*. Incidentally, brush elements 2 are formed symmetrically relative to a virtual line, which intersects limb 2*c* centrally and orthogonally.

Thus, holder 1 and brush elements 2, among other things, form the slip-ring brush which may represent the stator in a slip-ring unit. In this context, holder 1 comes to lie parallel to an xy-plane.

As a counterpart to the stator, a rotor 3 is provided in a slip-ring unit, the rotor including a plurality of electroconductive slip rings 3.1. Slip rings 3.1 are mounted axially side-by-side on an insulating carrier sleeve 3.2, an electrically non-conductive insulating ring 3.3 being disposed between adjacent slip rings 3.1. All slip rings 3.1 may be disposed coaxially. The rotation axis of rotor 3 is at the same time axis of rotation Y of the slip-ring unit, so that rotor 3 is rotatable about axis of rotation Y relative to the slip-ring brush. Each slip ring 3.1 has a circumferential groove 3.11, which in the example illustrated in a sectional plane on which axis of rotation Y lies, has a V-shaped geometry. On their inner side, slip rings 3.1 are each electrically contacted to a cable.

Figure 2:
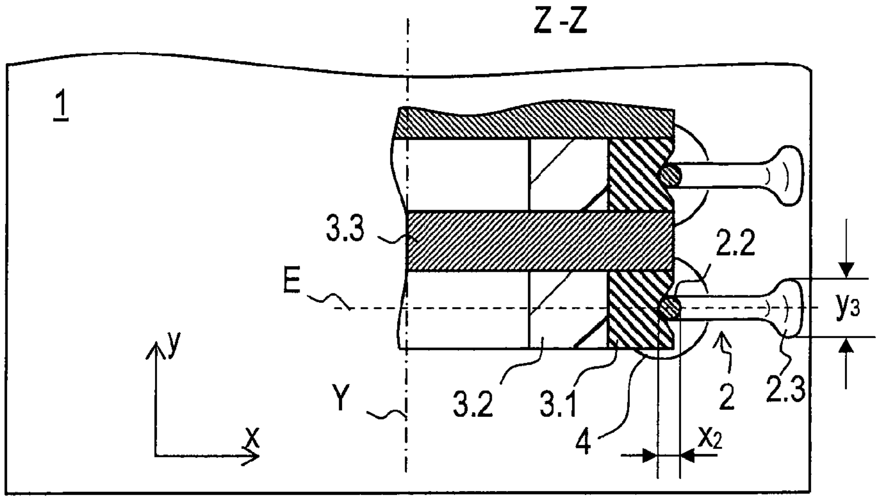
FIG. 2 is a plan view of the slip-ring unit in partial cross-section.

Each brush element 2 abuts in its second regions 2.2 against a slip ring 3.1, and is therefore in mechanical and electrical contact with it. FIG. 2 is a cross-sectional view taken along the line Z-Z that is parallel to the xy-plane and that goes through brush elements 2 in second regions 2.2. In their second regions 2.2, brush elements 2 exhibit a circular cross-sectional geometry $Q_2$ having a cross-sectional area A and a diameter d (see also FIG. 3). A high-quality running performance of the slip-ring unit is achieved by the combination of circular cross-sectional geometry Q2 with the V-shaped geometry of groove 3.11. Any axial relative shifts between brush element 2 and slip ring 3.1 during operation of the slip-ring unit are prevented by the guidance in V-groove 3.11.

Figure 3A:
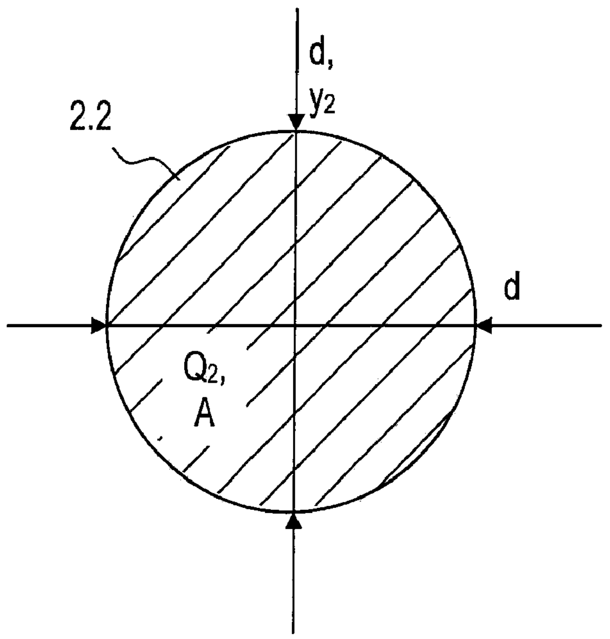
FIGS. 3*a* and 3*b* are cross-sectional views of different regions of a brush element.
Figure 3B:
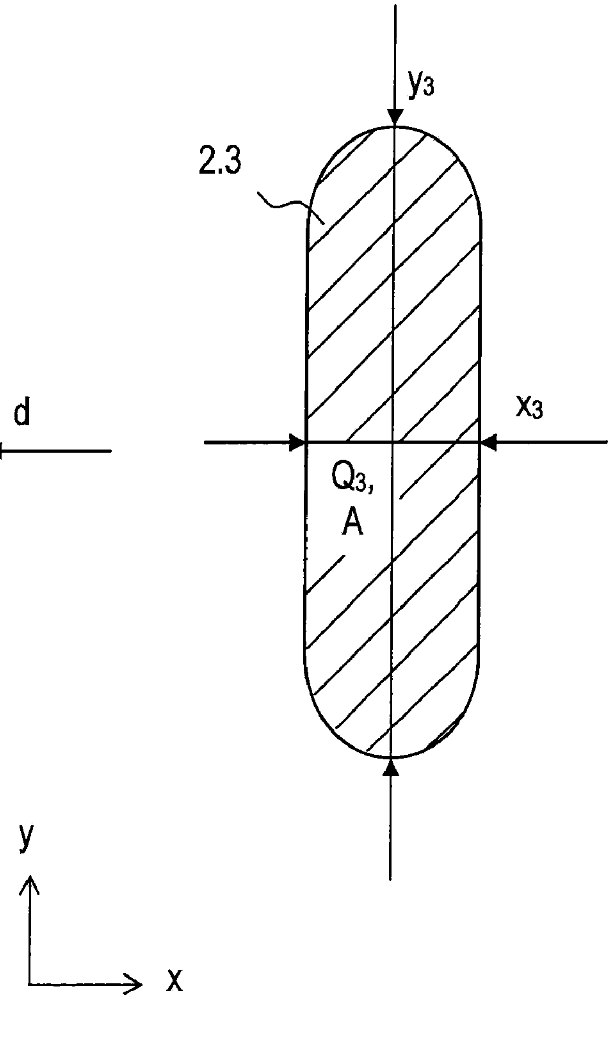

Thus, for example, the electric current to be transmitted is introduced from slip ring 3.1 into the two second regions 2.2 of each brush element 2, and then flows to fixing points 4. The electric current may then be conducted further to a device on the stator side via solder pads 1.1 and connecting cable on the lower side of holder 1. For operation of the slip-ring unit, each brush element 2 should always be in contact with corresponding slip ring 3.1, that is, each brush element 2 permanently abuts against slip ring 3.1. A decisive variable for this behavior is the effective spring stiffness of brush element 2. In the example illustrated, the spring movements of brush element 2 which are effective for the abutment proceed in a plane E, which is aligned in space such that it is penetrated perpendicularly by axis of rotation Y. In other words, geometric plane E is disposed orthogonally with respect to the xy-plane. As a result of the spring movements, opposite limbs 2*a*, 2*b*, e.g., in second regions 2.2, are able to move in the x-direction, i.e., orthogonally with respect to axis of rotation Y in plane E. That is to say, distance X between the two opposite second regions 2.2 is able to change due to the effective spring movement, i.e., the distance between axis of rotation Y and a second region 2.2 may be variable, for example, in response to errors in eccentricity. To positively influence the effective spring stiffness, cross-sectional geometry $Q_3$ of brush element 2 in third region 2.3 in each case differs from cross-sectional geometry $Q_2$ of second region 2.2, which here has a circular shape. As illustrated in FIGS. 3*a* and 3*b*, this deviation is such that one dimension $x_3$ in third region 2.3 of brush element 2 in direction x is smaller than diameter d or dimension $x_2$. In this context, direction x is aligned parallel to plane E or orthogonally with respect to axis of rotation Y. Thus, according to dimension $x_3$, brush element 2 in third region 2.3 is narrower or thinned in the x-direction, while in the y-direction having dimension $Y_3$, it exhibits a thickening compared to dimension $Y_2$.

Cross-sectional geometries $Q_2$, $Q_3$ of second regions 2.2 and of third regions 2.3 are produced by sections in planes, which in each case are aligned perpendicular to the center axis of the bent wire, from which brush element 2 is made. Thus, cross-sectional geometries $Q_2$, $Q_3$ concern the form or shape of the wire cross-sections in relevant regions 2.2, 2.3. As illustrated in FIGS. 1 and 3*a*, dimension $x_2$ does not correspond exactly to diameter d of cross-sectional geometry $Q_2$, because the alignment of brush element 2 in second regions 2.2 has both a z-component and an x-component.

Due to the flexible prestressing of opposite limbs 2*a*, 2*b* of brush element 2, the necessary effective contact force is provided, so that brush element 2 in its second region 2.2 permanently abuts against slip ring 3.1. The effective contact forces, which are decisive for pressing brush element 2 against respective slip ring 3.1, are thus aligned substantially in the radial direction toward axis of rotation Y of the slip-ring unit. Due to the oval form of cross-sectional geometry $Q_3$, that is, due to reduced dimension $x_3$ of brush element 2 in its third region 2.3 (see FIG. 3*b*) compared to dimension d or $x_2$, the effective spring stiffness of entire brush element 2 is reduced. Reduced dimension $x_3$ of brush element 2 relates to the x-direction, thus transversely to the longitudinal axis of the wire from which brush element 2 is made. In addition, explained above, the x-direction is directed orthogonally with respect to axis of rotation Y of the slip-ring unit. As in second region 2.2 of brush element 2, cross-sectional area A in third region 2.3 of brush element 2 amounts to, e.g., approximately $3.14 \cdot 10^{-2}$ $mm^2$.

To achieve these geometrical proportions, in the course of manufacturing from a piece of wire, each brush element 2 is formed without cutting, for instance, by pressing, in relevant third region 2.3. In this manner, an optimized operating performance of the slip-ring unit may be attained easily and with low manufacturing expenditure. Because the material of brush element 2 is incompressible, cross-sectional area A necessary for conducting the transmission current is also not reduced at any location by the pressing. Incidentally, brush element 2 has a cross-sectional geometry $Q_3$ deviating from the circular shape only in third region 2.3. Otherwise, brush element 2 exhibits a round cross-sectional geometry $Q_2$ having diameter d.

The operational performance of the slip-ring unit is further improved by arranging brush element 2 such that third region 2.3 is situated comparatively close to the fixing point, that is, close to first region 2.1 of brush element 2. On the other hand, the distance between third region 2.3 of brush element 2 and second region 2.2 is dimensioned to be relatively large. As illustrated, brush element 2 is arranged such that in each case, its third region 2.3 is situated closer to adjacent first region 2.1 than to likewise adjacent second region 2.2. In other words, the section of brush element 2 between first region 2.1 and third region 2.3 is shorter than the section of brush element 2 between second region 2.2 and third region 2.3.

Due to the form of brush element 2, the effective spring stiffness is reduced. However, the effective pressure forces are not reduced due to the measures described, because the geometry of brush element 2 and therefore the corresponding deformation in the slip-ring unit is adapted to the necessary magnitude of the pressure forces.

Holder 1 and brush elements 2 are used as stator, while slip rings 3.1 are assigned to rotor 3 of the slip-ring unit. The functioning method of the slip-ring unit may also be reversed, so that holder 1 and brush elements 2 rotate, and slip rings 3.1 stand still. However, the location and the alignment of geometric axis of rotation Y of the slip-ring unit remain the same, regardless of the functioning method selected.

What is claimed is:

1. A slip-ring brush, comprising:

a holder; and a brush element having three regions, the brush element joined to the holder in a first region of the brush element, a second region of the brush element including a cross-sectional geometry having a cross-sectional area predetermined for contact with a slip ring, a third region of the brush element having a cross-sectional area the same as the cross-sectional area of the second region, the third region disposed between the first region and the second region, a cross-sectional geometry in the third region shaped to deviate from the cross-sectional geometry of the second region to reduce an effective spring stiffness of the brush element.

2. The slip-ring brush according to claim 1, wherein the third region is arranged closer to the first region than to the second region.

3. The slip-ring brush according to claim 1, wherein the effective spring stiffness of the brush element relates to spring movements that have a directional component in a direction, and a dimension, in the direction, of the brush element in the third region is smaller than a dimension, in the direction, of the brush element in the second region.

4. The slip-ring brush according to claim 1, wherein the brush element includes two opposite limbs.

5. The slip-ring brush according to claim 4, wherein each of the two opposite limbs includes a respective second region.

6. The slip-ring brush according to claim 5, wherein at least one of the opposite limbs includes the third region, movement of the second region taking place in a direction parallel to a plane due to spring movements of the brush element within the plane, a dimension, in the direction, of the brush element in the third region smaller than a dimension, in the direction, of the brush element in the second region.

7. The slip-ring brush according to claim 1, wherein the brush element has a circular cross-sectional geometry in the second region and a non-circular cross-sectional geometry in the third region.

8. The slip-ring brush according to claim 7, wherein the effective spring stiffness of the brush element relates to spring movements that have a directional component in a direction, and a dimension, in the direction, of the brush element in the third region is smaller than a diameter of the brush element in the second region.

9. A slip-ring unit, comprising:

a slip ring;

a holder; and a brush element having three regions, the brush element and the slip ring rotatable relative to each other about an axis of rotation, the brush element joined to the holder in a first region of the brush element, a second region of the brush element including a cross-sectional geometry having a cross-sectional area and in contact with the slip ring, a third region of the brush element having a cross-sectional area the same as the cross-sectional area of the second region, the third region disposed between the first region and the second region, a cross-sectional geometry of the brush element in the third region shaped to deviate from the cross-sectional geometry of the second region to reduce an effective spring stiffness of the brush element.

10. The slip-ring unit according to claim 9, wherein a dimension, in a direction parallel to the axis of rotation, of the cross-sectional geometry of the brush element in the third region is larger than a dimension, in a direction parallel to the axis of rotation, of the cross-sectional geometry of the brush element in the second region.

11. The slip-ring unit according to claim 9, a dimension, in a direction orthogonal to the axis of rotation, of the cross-sectional geometry of the third region is smaller than the dimension, in a direction parallel to the axis of rotation, of the cross-sectional geometry of the third region.

12. The slip-ring unit according to claim 9, wherein the third region is arranged closer to the first region than to the second region.

13. The slip-ring unit according to claim 9, wherein the effective spring stiffness of the brush element relates to spring movements having a directional component in a direction orthogonal to the axis of rotation, a dimension, in the direction orthogonal to the axis of rotation, of the brush element in the third region smaller than a dimension, in the direction orthogonal to the axis of rotation, of the brush element in the second region.

14. The slip-ring unit according to claim 9, wherein the brush element includes two opposite limbs.

15. The slip-ring unit according to claim 14, wherein each of the two opposite limbs includes a respective second region.

16. The slip-ring unit according to claim 14, wherein at least one of the opposite limbs includes the third region, movement of the second region taking place in a direction parallel to a plane due to spring movements of the brush element in the plane, a dimension, in a direction orthogonal to the axis of rotation, of the brush element in the third region smaller than a dimension, in the direction orthogonal to the axis of rotation, of the brush element in the second region.

17. The slip-ring unit according to claim 9, wherein a dimension, in a direction parallel to the axis of rotation, of the brush element in the third region is larger than a dimension, in a direction orthogonal to the axis of rotation, in the third region.

18. The slip-ring unit according to claim 9, wherein the slip ring includes a circumferential groove, the second region fitting in the groove.

19. The slip-ring unit according to claim 18, wherein the groove has a V-shaped geometry.

20. The slip-ring unit according to claim 9, wherein the brush element has a circular cross-sectional geometry in the second region and a non-circular cross-sectional geometry in the third region.

21. A slip-ring unit, comprising:

a slip ring;

a holder; and a brush element having three regions, the brush element and the slip ring rotatable relative to each other about an axis of rotation, the brush element joined to the holder in a first region of the brush element, a second region of the brush element including a cross-sectional geometry having a cross-sectional area and in contact with the slip ring, a third region of the brush element having a cross-sectional area the same as the cross-sectional area in the second region, the third region disposed between the first region and the second region, a cross-sectional geometry of the brush element in the third region deviating from a circular shape, a dimension, in a direction parallel to the axis of rotation, of the brush element in the third region larger than a dimension, in a direction orthogonal to the axis of rotation, in the third region.

22. The slip-ring unit according to claim 21, wherein the brush element includes two opposite limbs.

23. The slip-ring unit according to claim 22, wherein each of the two opposite limbs includes a respective second region.

24. The slip-ring unit according to claim 22, wherein at least one of the opposite limbs of the brush element includes the third region, movement of the second region taking place in a direction parallel to a plane due to spring movements of the brush element within the plane, a dimension, in the direction orthogonal to the axis of rotation, of the brush element in the third region smaller than a dimension, in the direction orthogonal to the axis of rotation, of the brush element in the second region.

25. The slip-ring unit according to claim 21, wherein the slip ring includes a circumferential groove, the second region of the brush element fitting in the groove.

26. The slip-ring unit according to claim 25, wherein the groove has a V-shaped geometry.

27. The slip-ring unit according to claim 21, wherein the brush element has a circular cross-sectional geometry in the second region.

* * * * *